(12) United States Patent
Matsumoto et al.

(10) Patent No.: US 6,215,615 B1
(45) Date of Patent: Apr. 10, 2001

(54) DATA STORAGE DEVICE

(75) Inventors: Hiroshi Matsumoto, Hikone; Mihoko Hirao, Ibaraki, both of (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/201,882

(22) Filed: Nov. 30, 1998

(30) Foreign Application Priority Data

| Nov. 28, 1997 | (JP) | 9-343791 |
| Nov. 28, 1997 | (JP) | 9-343792 |
| Apr. 17, 1998 | (JP) | 10-124095 |
| Oct. 16, 1998 | (JP) | 10-295692 |

(51) Int. Cl.[7] .................................................. G11B 17/00
(52) U.S. Cl. ........................................ 360/99.08; 420/42
(58) Field of Search ............................ 360/88, 97.01, 360/99.08; 420/96, 42, 8

(56) References Cited

U.S. PATENT DOCUMENTS

| 3,859,083 | * | 1/1975 | Kusaka et al. ................. 420/12 |
| 3,902,898 | * | 9/1975 | Denhard, Jr. et al. ............ 420/42 |
| 4,663,550 |   | 5/1987 | Kawada et al. . |
| 4,711,677 | * | 12/1987 | Mendelson ..................... 148/325 |
| 4,806,304 |   | 2/1989 | Kimura et al. . |
| 5,031,061 | * | 7/1991 | Hatch ........................... 360/98.07 |
| 5,200,866 | * | 4/1993 | Fruge et al. .................... 360/99.08 |
| 5,400,197 | * | 3/1995 | Jabbari et al. .................. 360/99.08 |
| 5,485,331 | * | 1/1996 | Dunfield et al. ................ 360/99.08 |
| 5,539,597 | * | 7/1996 | Blanks ........................... 360/106 |
| 5,601,664 | * | 2/1997 | Kosa et al. ..................... 148/325 |
| 5,689,388 | * | 11/1997 | Oka et al. ....................... 360/99.12 |
| 5,729,404 | * | 3/1998 | Dunfield et al. ................ 360/99.08 |
| 5,788,922 | * | 8/1998 | Magee, Jr. ...................... 420/42 |
| 5,837,190 | * | 11/1998 | Kosa et al. ..................... 420/42 |
| 5,844,748 | * | 12/1998 | Dunfield et al. ................ 360/99.08 |
| 6,033,625 | * | 3/2000 | Nagashima et al. ............. 420/42 |
| 6,146,475 | * | 11/2000 | Kosa ............................. 148/325 |

OTHER PUBLICATIONS

Alvarez de Toledo, G.; Campo, O.; Lainez, E.; "Influence of Sulfur and Mn/S ratio on hot ductility of steels during continuous casting", Steel Research, vol. 64, No. 6, Jun. 1993, © 2000 Institution of Electrical Engineers, pp. 292–299.*

* cited by examiner

Primary Examiner—William R. Korzuch
Assistant Examiner—Franklin D. Altman
(74) Attorney, Agent, or Firm—Burns, Doane, Swecker & Mathis, LLP

(57) ABSTRACT

Provided are novel data storage devices, such as hard disk apparatuses. The devices include a clean chamber accommodating a component formed from a free cutting stainless steel. The free cutting stainless steel has a sulfur (S) content of not less than 0.25 percent by mass and a manganese-to-sulfur content ratio (Mn/S) of not greater than 1.8. The free cutting stainless steel has been subjected to: (1) an acid cleaning; (2) to a passivation treatment; (3) to a degreasing treatment and to a subsequent rust-removing, descaling chemical treatment; or (5) to a degreasing treatment and to a subsequent chromate treatment.

20 Claims, 4 Drawing Sheets

| | SILVER PLATE DISCOLORATION | NUMBER OF RUSTING SAMPLES | NUMBER OF SULFUR-CONTAINING PARTICLES |
|---|---|---|---|
| a) | No Discoloration | 1/20 | 0/50 |
| b) | No Discoloration | 1/20 | 0/50 |
| c) | No Discoloration | 1/20 | 0/50 |
| d) | No Discoloration | 10/20 | 7/50 |
| e) | No Discoloration | 0/20 | 0/50 |

FIG. 5

|  | SILVER PLATE DISCOLORATION | NUMBER OF RUSTING SAMPLES | NUMBER OF SULFUR-CONTAINING PARTICLES |
|---|---|---|---|
| a) | No Discoloration | 1/20 | 0/50 |
| b) | No Discoloration | 10/20 | 7/50 |
| c) | Considerable Discoloration | 1/20 | 0/50 |
| d) | Heavy Discoloration | 1/20 | 0/50 |
| e) | Almost No Discoloration | 2/20 | 0/50 |
| f) | Almost No Discoloration | 0/20 | 0/50 |
| g) | No Discoloration | 3/20 | 0/50 |
| h) | Almost No Discoloration | 2/20 | 0/50 |
| i) | Considerable Discoloration | 3/20 | 0/50 |
| j) | Considerable Discoloration | 2/20 | 0/50 |

FIG. 6

|   | SILVER PLATE DISCOLORATION | NUMBER OF RUSTING SAMPLES | NUMBER OF SULFUR-CONTAINING PARTICLES |
|---|---|---|---|
| a) | No Discoloration | 2/20 | 1/50 |
| b) | No Discoloration | 2/20 | 1/50 |
| c) | No Discoloration | 1/20 | 0/50 |
| d) | Slight Discoloration | 1/20 | 0/50 |
| e) | Discoloration Observed | 10/20 | 2/50 |
| f) | Discoloration Observed | 12/20 | 3/50 |
| g) | Discoloration Observed | 15/20 | 12/50 |
| h) | No Discoloration | 3/20 | 1/50 |
| i) | No Discoloration | 1/20 | 0/50 |

DATA STORAGE DEVICE

CROSS-REFERENCE TO RELATED APPLICATIONS

This application claims the benefit of priority under 35 U.S.C. §119, of Japanese Application Nos. 09-343791, filed Nov. 28, 1997, 09-343792, filed Nov. 28, 1997, 10-124095, filed Apr. 17, 1998 and 10-295692, filed Oct. 16, 1998, the contents of each of said documents being incorporated herein by reference.

BACKGROUND OF THE INVENTION

1. Field of the Invention

The present invention relates to a data storage device, such as a hard disk apparatus. The present invention also relates to a hard disk apparatus, which finds use as a main or auxiliary storage device of a computer system.

2. Description of the Related Art

Hard disk apparatuses generally have a clean chamber defined by a base member and a cover member, and one or more hard disks accommodated in the clean chamber so as to be accessible by a magnetic head supported by a head arm.

More specifically, at least a rotor hub of a spindle motor is rotatably received in the clean chamber, and one or more hard disks are mounted on the rotor hub. The clean chamber additionally accommodates a head assembly which includes a voice coil motor. The voice coil motor serves to rotationally drive the head arm, such that the magnetic head on an end of the arm traces the surface of each disk to read and write data.

In the hard disk apparatus of the type described above, the air inside the clean chamber must be maintained at a high degree of cleanness in order to enhance the recording density and to prevent any crush attributable to jamming of dust particles between the head and the disk surface. This requires not only that the interior of the clean chamber be shielded from the ambient air to prevent invasion by dust, but also that the generation of dust particles, or so-called contaminants, inside the clean chamber be suppressed.

Stainless steels, which are resistant to rusting as compared with ordinary steels or structural steels, are most commonly used as the materials for parts inside the clean chamber, such as the shaft and the rotor hub of the spindle motor, the shaft and arm of the head assembly and other elements, such as screws. The use of such stainless steels is intended mainly to satisfy the above-described requirements.

At the same time, a high degree of dimensional precision is required for parts of a precision machine or device, such as a hard disk apparatus. This, in turn, requires a high degree of workability of the material to be used. Among the various types of working techniques which are available, cutting, i.e., machining, is most frequently employed. Free cutting steels, which contain various free cutting elements serving to improve cutting characteristic, i.e., machinability, are therefore finding broadened use.

Although stainless steel in general is hard to machine, machinability can be improved by the addition thereto of free cutting elements, such as sulfur (S), tellurium (Te), selenium (Se), etc. Stainless steel containing sulfur as a free cutting element at a content of 0.25 percent by mass or greater is commonly used because of its moderate cost and good machinability. In this type of steel, sulfur exists primarily in the form of manganese sulfide (MnS). The manganese-to-sulfur content ratio Mn/S is usually set at about 4, in consideration of stability in production and ease of machining.

The above-described stainless steel is, thus, rich in sulfur, which is added for the purpose of improving machinability, and is present primarily in the form of manganese sulfide. There is, however, a risk that manganese sulfide will generate a corrosive hydrogen sulfide ($H_2S$) gas upon reaction with the moisture in atmospheric air. For this reason, ordinary stainless steels having an Mn/S ratio of about 4 are not suitable for use as the material for parts of a hard disk apparatus in a hermetic clean chamber.

In contrast, stainless steels having an Mn/S ratio not greater than 1.8 are substantially free of generation of sulfur-containing gases. Such smaller value of the Mn/S ratio, i.e., a smaller Mn content, reduces the tendency of formation of the chemically active manganese sulfide. Instead, the formation of chromium sulfide (CrS), which is more stable than manganese sulfide, is enhanced.

Stainless steels having an Mn/S ratio not greater than 1.8, however, tend to rust. At the same time, they exhibit a higher chemical stability in wet environments. In addition, these stainless steels are liable to generate particles containing sulfur, which is intended to improve machinability. This poses a risk of contamination by corrosive particles.

A stainless steel containing 0.25 percent by mass or greater of sulfur as a free cutting element at a manganese-to-sulfur ratio Mn/S of around 4 may be subjected to a heat treatment, e.g., baking. This serves to forcibly release sulfur gas, thereby suppressing contamination. In addition, such a stainless steel may be passivation-treated to attain improved corrosion resistance while allowing removal of particles. A heat treatment as described above may be conducted after the passivation treatment. Processes including such treatments, however, are not recommended from the view points of yield and equipment cost.

It is also possible to employ a free cutting stainless steel having a sulfur content of 0.25 percent by mass or greater at a manganese-to-sulfur ratio Mn/S of 1.8 or less. This free cutting stainless steel, however, also poses a problem when subjected to an acid cleaning conducted with an acid solution having an acid concentration exceeding 15 percent by volume. In this regard, it permits the dissolution of free cutting grains rich in chemically stable CrS, thereby allowing the generation of $H_2S$.

Under these circumstances, it is an object of the present invention to provide a hard disk apparatus which suppresses the generation of sulfur-containing corrosive gas from stainless steel in the clean chamber. This prevents a reduction in resistance to corrosion while preventing particle contamination caused by matter which may be freed from surfaces of the parts constructed of the stainless steel.

Other objects and advantages of the present invention will become apparent to one of ordinary skill in the art upon review of the specification, drawings and claims appended hereto.

SUMMARY OF THE INVENTION

In accordance with one aspect of the present invention, provided is a hard disk apparatus. The apparatus comprises a clean chamber accommodating a hard disk driven by a spindle motor, and a magnetic head capable of making access to the hard disk. A free cutting stainless steel is used as the material of a member accommodated in the clean chamber. The free cutting stainless steel has a sulfur (S) content of not less than 0.25 percent by mass and a manganese-to-sulfur content ratio (Mn/S) of not greater than 1.8. The free cutting stainless steel has been subjected to an acid cleaning.

Preferably, the acid cleaning is conducted with an aqueous solution of an acid capable of removing contaminants, rust and scale remaining on the surface of the free cutting stainless steel. The acid cleaning is preferably conducted with a solution of nitric acid. More preferably, the free cutting stainless steel after the acid cleaning is subjected to a neutralizing treatment and further to a chromate treatment.

In accordance with a further aspect of the invention, a hard disk apparatus is provided which comprises a clean chamber accommodating a hard disk driven by a spindle motor, and a magnetic head capable of making access to the hard disk. A free cutting stainless steel is used as the material of a member accommodated in the clean chamber. The free cutting stainless steel has a sulfur (S) content of not less than 0.25 percent by mass and a manganese-to-sulfur content ratio (Mn/S) of not greater than 1.8. The free cutting stainless steel has been subjected to a passivation treatment.

Preferably, the passivation treatment is conducted with a treating solution which is nitric acid alone. Alternatively, the passivation treatment can be conducted with a treating solution which a mixture of nitric acid and sodium bichromate, followed by an alkali neutralizing treatment. The alkali neutralizing treatment is preferably followed by a chromate treatment.

It is also preferred that the stainless steel be heat-treated to a temperature of from about 100° C. to about 200° C. after the passivation treatment. Alternatively, the heat treatment may be conducted at a temperature of from about 70° C. to about 150° C. in a vacuum or a substantially vacuum atmosphere after the passivation treatment.

In accordance with a further aspect of the invention, a hard disk apparatus is provided which comprises a clean chamber accommodating a hard disk driven by a spindle motor, and a magnetic head capable of making access to the hard disk. A free cutting stainless steel is used as the material of a member accommodated in the clean chamber. The free cutting stainless steel has a sulfur (S) content of not less than 0.25 percent by mass and a manganese-to-sulfur content ratio (Mn/S) of not greater than 1.8. The free cutting stainless steel has been subjected to a degreasing treatment and to a subsequent rust-removing, descaling chemical treatment.

By reducing the manganese-to-sulfur content ratio (Mn/S) below 1.8, the sulfur compound contained within the free cutting stainless steel stabilizes, and the sulfur-containing corrosive gas generated from the sulfur compound by reaction with moisture in the air is reduced. The resistance to corrosion can thereby be improved. Because the free cutting component is almost free from dissolution by the acid treatment, the generation of the gas and particles can effectively be prevented.

The rust-removing, descaling chemical treatment should be conducted under such conditions that are effective to remove any contaminant, rust and scale remaining on the surface of the free cutting stainless steel part, thereby improving the resistance to corrosion. The rust-removing, descaling chemical treatment further should be conducted at gentle conditions so as to avoid dissolution of free cutting components contained in the free cutting stainless steel. This can be accomplished by, for example, an aqueous solution of an acid having an acid concentration of 3 percent by mass or less, or by alkali electrolytic cleaning. Preferably, the free cutting stainless steel part is subjected to a chromate treatment subsequent to the chemical rust-removing and descaling treatment.

In accordance with a further aspect of the invention, a hard disk apparatus is provided which comprises a clean chamber accommodating a hard disk driven by a spindle motor, and a magnetic head capable of making access to the hard disk. A free cutting stainless steel is used as the material of a member accommodated in the clean chamber. The free cutting stainless steel has a sulfur (S) content of not less than 0.25 percent by mass and a manganese-to-sulfur content ratio (Mn/S) of not greater than 1.8. The free cutting stainless steel has been subjected to a degreasing treatment and to a subsequent chromate treatment.

As described above, by reducing the manganese-to-sulfur content ratio (Mn/S) below 1.8, the sulfur compound contained within the free cutting stainless steel stabilizes, improving the resistance to corrosion. Additionally, the sulfur-containing corrosive gas generated from reaction of the sulfur compound with moisture in air is reduced.

Moreover, as a result of chromate treatment, resistance to corrosion may be improved regardless of the generation of the sulfur-containing corrosive gas and of the dissolution of the free cutting components from the sulfur compound. In such a case, it is preferable to remove the oil or grease and acid scale caused by machining in mechanical descaling prior to degreasing. The scale can thereby be removed from the surface of the steel material, and the resistance to corrosion may be further improved by the subsequent chromate treatment.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

Figure 1:
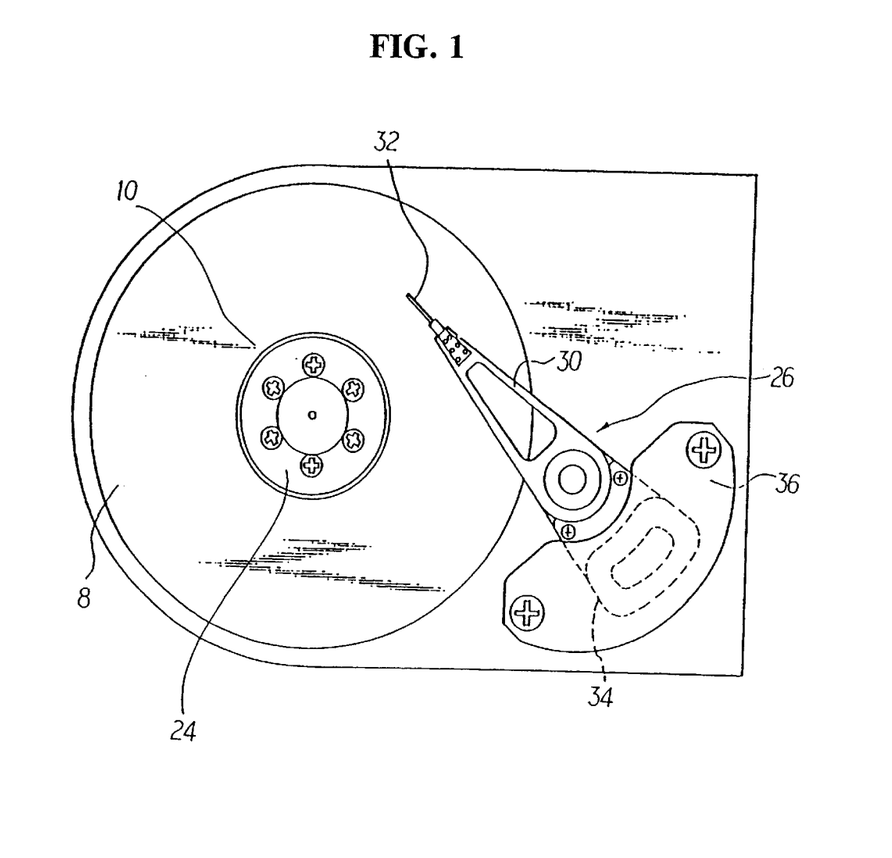
FIG. 1 is a plan view of an embodiment of a hard disk apparatus, with the cover device removed therefrom.
Figure 2:
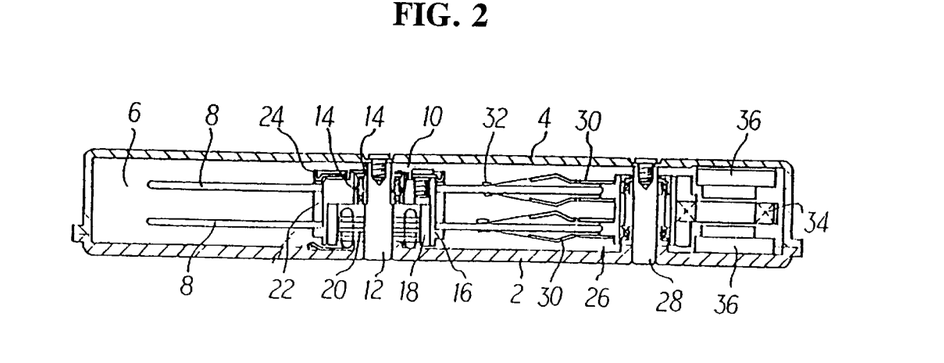
FIG. 2 is a sectional elevational view of the hard disk apparatus shown in FIG. 1.

Exemplary aspects of the present invention will be now be described with reference to the drawing figures. While the invention is directed to data storage devices in general, the following exemplary aspects of the invention will be described with reference to a hard disk apparatus. FIG. 1 is a schematic plan view of a hard disk apparatus with a cover member part being removed therefrom. FIG. 2 is a sectional view of the same.

The hard disk apparatus has a clean chamber defined by a base member 2 and a cover member 4 covering the base member 2. The internal space 6 of the clean chamber is hermetically sealed against the ambient air, so that clean atmosphere is maintained inside the clean chamber. At least one hard disk 8 (two disks shown in the illustrated embodiment) having a central hole is disposed in the internal space 6 of the clean chamber in such a manner as to be rotationally driven by a spindle motor 10.

The spindle motor 10 has a shaft 12 provided on the base member 2, a cup-shaped rotor hub 16 rotatably supported on top of the shaft 12 through a pair of bearings 14, and a stator 20 fixed to a lower portion of the shaft 12 so as to face rotor magnets 18 on the rotor hub 16 across a small gap. The shaft 12 is fixed to and supported by the cover member 4, by means of a screw which is screwed into the upper end of the shaft 12. The hard disks 8, with the brims of their central holes fitting on the rotor hub 16, are fixed to the rotor hub 12 by means of a clamp member 24, with a spacer 22 intervening therebetween.

The inner space 6 of the clean chamber also receives a head assembly 26. The head assembly 26 has a plurality of pairs of head arms 30 (two pairs shown in the illustrated embodiment) swingably supported by a pivot shaft 28 fixed to the base member 2, magnetic heads 32 secured to ends of the respective head arms 30, and a voice coil 34 provided on the base ends of the head arms 30.

The arrangement is such that, when the voice coil 34 is electrically energized, the head arms 30 are caused to oscillate with respect to upper and lower stationary yoke plates 36, such that each magnetic head traces the surface of the associated hard disk 8 to write and read data in and from the hard disks 8.

As described above, the internal space 6 of the cleaning chamber accommodates various components, such as the spindle motor 10 for driving the hard disks, as well as head assembly 26 for driving and controlling the magnetic heads 32 which trace the surfaces of the hard disks 8. There are internal parts and components made of a stainless steel, such as the rotor hub 16, shafts 12, 28, etc. These parts or components, referred to as stainless-steel parts, are constructed of a free cutting stainless steel.

The free cutting stainless steel has a sulfur (S) content of 0.25 percent by mass or greater and, hence, exhibits superior machinability. Sulfur as the element for enhancing machinability is present in the form of manganese sulfide (MnS) in the free cutting stainless steel. The manganese-to-sulfur ratio (Mn/S) is set to be 1.8 or less, preferably 1.5 or less. Thus, the content of chemically active manganese sulfide can be maintained at a low level so as to restrain the stainless steel from generating sulfur-containing gases.

1. Acid Cleaning of Free Cutting Stainless Steel

In accordance with a first aspect of the invention, the free cutting stainless steel which has been prepared to meet the above-described requirements is machined into a desired shape and is then subjected to an acid cleaning which is conducted with an aqueous solution of an acid, such as nitric acid, whereby the surface of the machined stainless steel part is cleaned. More specifically, this degreasing treatment effectively serves to remove chlorine and sulfur transferred from the machining oil during the machining, and scale generated during the machining, as well as micro-fine grains of free cutting components such as manganese sulfide. Thus, the corrosion resistance peculiar to the stainless steel material can be fully utilized and contamination by particles can effectively be avoided.

The acid cleaning may, alternatively, be conducted using other acidic solutions than that described above. This is provided that the acidic solution is effective to remove contaminants, scale and free cutting elements from the surface of the free cutting stainless steel. For example, it is possible to use an aqueous solution of sulfuric acid, hydrochloric acid or hydrofluoric acid.

The stainless steel which has undergone the above-described acid cleaning exhibits improved corrosion resistance and can prevent particle contamination. When a further improvement in the corrosion resistance is desired or required, the stainless steel which has undergone the acid cleaning may also be subjected to an alkali neutralizing treatment and a subsequent chromate treatment. As a result, an oxide film is forcibly formed on the surface of the stainless steel, thereby enhancing remarkably the corrosion resistance.

Advantages of the above-described aspects of the present invention can be further appreciated in light of the following examples.

EXAMPLE 1

An 18 Cr stainless steel, having a sulfur content of 0.3 percent by mass and a manganese content of 0.4 percent by mass (Mn/S ratio=1.33), was prepared. This stainless steel was machined to form samples of a rotor hub 40 shown in FIG. 3, i.e., the rotor hub which forms part of a spindle motor and which is to be accommodated in the clean chamber of a hard disk apparatus.

Each sample of the rotor hub 40 thus formed was subjected to an alkali degreasing treatment and was then subjected to a 40-minute acid cleaning conducted with a 10 percent by volume aqueous solution of nitric acid at 50° C., followed by rinsing with water, pure hot water and pure water and a subsequent hot-air dehydration. A silver plate (stainless steel sheet plated with silver) was wound around each sample rotor hub thus obtained. The rotor hub together with the silver plate was wrapped in an aluminum foil and was shelved for 4 hours at 120° C. The silver plate was next taken out of the container for visual observation of the degree of discoloration (silver plate color test).

Twenty (20) pieces of such rotor hub samples, having undergone the acid cleaning treatment, were shelved for 360 hours in an 80° C. atmosphere of 90% humidity. Each piece of rotor hub was then subjected to optical microscopic observation for any rusting.

A conductive tape was brought into contact with the surface of each of three pieces of the sample rotor hubs which had undergone the acid cleaning, descaling chemical treatment. Fifty (50) arbitrarily selected particles of foreign matter transferred to the tape were analyzed through a scanning electron microscope/energy distribution X-ray analyzer (SEM/EDX), for the purpose of investigating the number of sulfur-containing particles.

Figure 4:
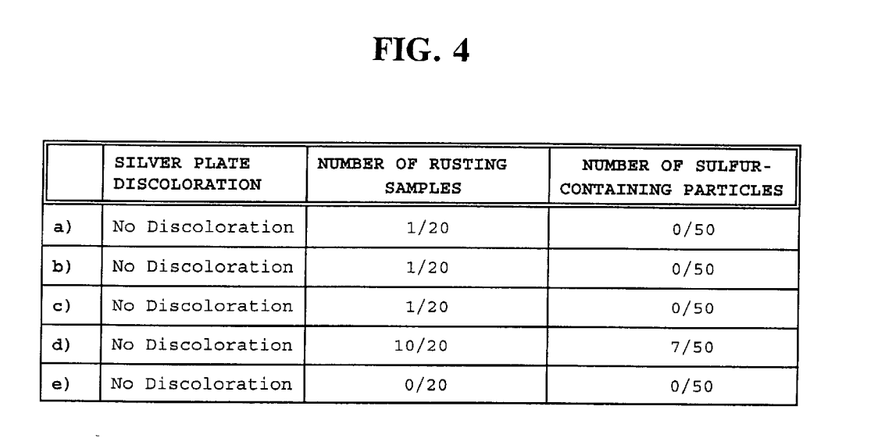
FIG. 4 is a table showing results of evaluation of the Examples and Comparative Examples for one aspect of the invention.

The results of this evaluation are summarized in line a) of the table shown in FIG. 4. As used in the table, the "Number of rusting samples" means the number of rotor hubs among the 20 sample pieces which were found to be rusty. The "Number of sulfur-containing particles," as used in the table, refers to the number of particles among the 50 arbitrary particles of foreign matter sampled which were found to be rusty.

EXAMPLE 2

Sample rotor hubs prepared in Example 1 were subjected to an alkali degreasing treatment and then to a 40-minute acid cleaning conducted with a 5 percent by volume aqueous solution of nitric acid at 50° C. The sample rotor hubs were then rinsed with water, hot pure water and pure water, followed by dehydration with hot air. The sample rotor hubs thus treated were evaluated to obtain the results shown in line b) of the table of FIG. 4.

EXAMPLE 3

Sample rotor hubs prepared in Example 1 were subjected to an alkali degreasing treatment and then to a 3-minute acid cleaning conducted with a mixed acid solution containing 10 percent by volume nitric acid and 2 percent by volume fluoric acid. The sample rotor hubs were then rinsed with water, hot pure water and pure water, followed by dehydration with hot air. The sample rotor hubs thus treated were evaluated to obtain the results shown in line c) of the table of FIG. 4.

COMPARATIVE EXAMPLE 1

Rotor hubs prepared as in Example 1 were directly subjected to cleaning with methylene chloride and a subsequent water rinse with the aid of a neutral detergent, without being subjected to acid cleaning. The rotor hubs thus treated were evaluated in the same manner as the Examples to obtain the results shown in line d) of the table of FIG. 4.

EXAMPLE 4

The sample rotor hubs prepared in Example 1 were immersed for 30 minutes in a 20 percent by volume aqueous solution of sodium hydroxide at 80° C., and then subjected to a chromate treatment conducted by immersing the rotor hubs in a 5 percent by weight aqueous solution of sodium bichromate at 70° C. for 30 minutes. Evaluation was conducted in the same manner as the preceding Examples to obtain the results shown in line e) of the table of FIG. 4.

As demonstrated by the results summarized in FIG. 4, the sample rotor hubs of Examples 1–4 exhibited superior corrosion resistance and no deposition of sulfur-containing particles, compared with that of the Comparative Example. In addition, Examples 1 to 4 showed no substantial generation of sulfur-containing gas which generation would adversely affect the hard disk apparatus, thus offering a remarkable advantage.

2. Passivation of Free Cutting Stainless Steel

In accordance with a second aspect of the present invention, the free cutting stainless steel which has been prepared to meet the above-described requirements, is machined into a desired shape and is then subjected to a passivation treatment. As a result of such treatment, chemically active manganese sulfide, which may be present on or deposited to the surface of the stainless steel during machining, is easily removed and any particle contamination which otherwise may be caused by the manganese sulfide is eliminated. This contributes to improvement in corrosion resistance and suppression of contamination by particles.

The passivation treatment effectively serves also to clean and remove rust from the surface of the stainless steel part. More specifically, chlorine contained in the cutting oil used during machining, as well as sulfur and scale which are formed in the course of the machining, are removed from the surface of the stainless steel part. As a result, the stainless steel part becomes more resistant to corrosion.

The passivation treatment is preferably, but not exclusively, conducted with an aqueous solution of nitric acid alone. Although hydrogen sulfide ($H_2S$) is generated in the course of the passivation treatment due to reaction between the nitric acid and sulfur compound existing in the stainless steel, such hydrogen sulfide can be removed by rinsing with water, hot water and finally with pure water conducted after the passivation treatment. When using nitric acid alone, the freeing of sulfur after the passivation treatment is reduced and can be completed in a relatively short time.

The passivation treatment may also be conducted using as the treating solution a mixture of nitric acid and sodium bichromate. In such treatment, the hydrogen sulfide generated as a result of the reaction between the nitric acid and the sulfur compound is oxidized by the sodium bichromate, so as to free sulfur. It is, however, difficult to remove the sulfur thus freed by rinsing, which undesirably acts as a source of the corrosive sulfur gas. In addition to its facilitating the removal of freed sulfur, corrosion by the acid is suppressed by virtue of the neutralizing, thus enhancing corrosion-resistance of the stainless steel.

The rate of generation of sulfur is, however, still lower with the passivation solution composed of the mixture of nitric acid and sodium bichromate as compared with conventional steel materials. This results from the free cutting stainless steel's smaller amount of chemically active manganese sulfide. The sulfur, therefore, can be removed without substantial difficulty by a subsequent neutralizing treatment.

Such a neutralizing treatment may optionally be followed by a chromate treatment, so that an oxide film is forcibly formed on the surface of the stainless steel part, thus achieving a remarkable improvement in corrosion resistance. It is noted that chromate treatment without the prior alkali neutralizing treatment undesirably allows generation of sulfur due to residual nitric acid or hydrogen sulfide adhering to the surface of the stainless steel part or in the pores from which the free cutting element has been freed.

Following the passivation treatment, baking may optionally be conducted in place of the neutralizing treatment and the subsequent chromate treatment. Freed sulfur can be removed without difficulty by baking, since the amount of sulfur is smaller than that of conventional free cutting stainless steels having the Mn/S ratio values of about 4. The baking serves to facilitate removal of acid and sulfur-containing gas on the surface of the stainless steel part, thus effectively suppressing contamination by particles.

The stainless steel which has undergone the passivation treatment is heated at a temperature of from about 100° C. to 200° C. This heating is effective not only in removing the sulfur gas remaining on the surface of the stainless steel part, but also in forcibly releasing the passivation solution, i.e., the acid. Preferably, the heating is conducted for a period of 10 hours or more. The heating may also be conducted in a vacuum or a substantially vacuum atmosphere. In such a case, the heating temperature may be set in a relatively low range of from about 70° C. to 150° C.

Advantages of the above-described aspects of the present invention can be further appreciated in light of the following examples.

EXAMPLE 5

An 18 Cr stainless steel, having a sulfur content of 0.3 percent by mass and a manganese content of 0.4 percent by mass (Mn/S ratio=1.33), was prepared. This stainless steel was machined to form samples of a rotor hub 40 shown in FIG. 3, i.e., the rotor hub which forms part of a spindle motor and which is to be accommodated in the clean chamber of a hard disk apparatus.

Each sample of the rotor hub 40 thus formed was subjected to a degreasing treatment conducted with an alkali solution, and then to a 40-minute passivation treatment conducted with a 50 percent by volume aqueous solution of nitric acid at 50° C. This was followed by rinsing with water, hot water and pure water and a subsequent dehydration by hot air. A silver plate, prepared by plating a stainless steel plate with silver, was wound around each sample rotor hub which had undergone the passivation treatment. The rotor hub together with the silver plate was wrapped in an aluminum foil and was shelved for 4 hours at 120° C. The silver plate was next separated, and a visual observation of the degree of discoloration (silver plate color test) was conducted.

Twenty (20) pieces of the passivation treated rotor hub samples, were prepared and shelved for 360 hours in an 80° C. atmosphere of 90% humidity. Each piece of rotor hub was then subjected to optical microscopic observation for any rusting.

A conductive tape was brought into contact with the surface of each of three pieces of the passivation treated sample rotor hubs. Fifty (50) arbitrarily selected particles of foreign matter transferred to the tape were analyzed through a scanning electron microscope/energy distribution X-ray analyzer (SEM/EDX), for the purpose of investigating the number of sulfur-containing particles. The results of this evaluation are summarized in line a) of the table shown in FIG. 5.

COMPARATIVE EXAMPLE 2

Sample rotor hubs prepared as in Example 5 were directly subjected to cleaning with methylene chloride, without passivation treatment, and to a subsequent water rinse with the aid of a neutral detergent. The rotor hubs thus treated were evaluated in the same manner as Example 5, to obtain the results shown in line b) of the table of FIG. 5.

COMPARATIVE EXAMPLE 3

Samples rotor hubs prepared as in Example 5 were subjected to an alkali degreasing, acid cleaning with dilute nitric acid, and then to a passivation treatment for 30 minutes at 50° C. in a liquid mixture of 25 percent by volume nitric acid and 2.0 percent by weight sodium bichromate. This was followed by rinsing with water, hot water and then pure water, and a subsequent dehydration by hot air. The rotor hub samples were then evaluated in the same manner as Example 5, to obtain the results shown in line c) of the table of FIG. 5.

COMPARATIVE EXAMPLE 4

Sample rotor hubs were prepared as in Example 5, from an 18 Cr stainless steel having a sulfur content of 0.3 percent by mass and a manganese content of 1.2 percent by mass (Mn/S=4.0). These sample rotor hubs were passivated in the same manner as described in Comparative Example 2, and were evaluated in the same manner as Example 5, to obtain the results shown in line d) of the table of FIG. 5.

EXAMPLE 6

Sample rotor hubs were subjected to the same passivation treatment as in Comparative Example 3, with the liquid mixture of 25 percent by volume nitric acid and 2.0 percent by weight sodium bichromate. In this case, however, the passivated samples were neutralized by being immersed in an 80° C., 20 percent by volume aqueous solution of sodium hydroxide for 30 minutes, prior to rinsing with water, hot water and then pure water. The rinsed samples were evaluated in the same manner as Example 5, to obtain the results shown in line e) of the table of FIG. 5.

EXAMPLE 7

Sample rotor hubs were subjected to passivation and neutralization as in Example 6, and were chromate-treated by being immersed in a 70° C., 5 percent by weight aqueous solution of sodium bichromate for 30 minutes. The samples after the chromate treatment were evaluated in the same manner as Example 5, to obtain the results shown in line f) of the table of FIG. 5.

EXAMPLE 8

Sample rotor hubs were subjected to passivation as in Comparative Example 3, followed by a 4-hour bake at 150° C. The samples were evaluated in the same manner as Example 5, to obtain the results shown in line g) of the table of FIG. 5.

EXAMPLE 9

Sample rotor hubs were subjected to passivation as in Comparative Example 3, followed by a 4-hour bake at 100° C. under a reduced pressure of 0.1 Torr. The samples were evaluated in the same manner as Example 5, to obtain the results shown in line h) of the table of FIG. 5.

COMPARATIVE EXAMPLE 5

Sample rotor hubs were subjected to passivation as in Comparative Example 4, followed by a 4-hour bake at 150° C. The samples were evaluated in the same manner as Example 5, to obtain the results shown in line i) of the table of FIG. 5.

COMPARATIVE EXAMPLE 6

Sample rotor hubs were subjected to passivation as in Comparative Example 4, followed by a 4-hour bake at 100° C. under a reduced pressure of 0.1 Torr. The samples were evaluated in the same manner as Example 5, to obtain the results shown in line i) of the table of FIG. 5.

Figure 5:
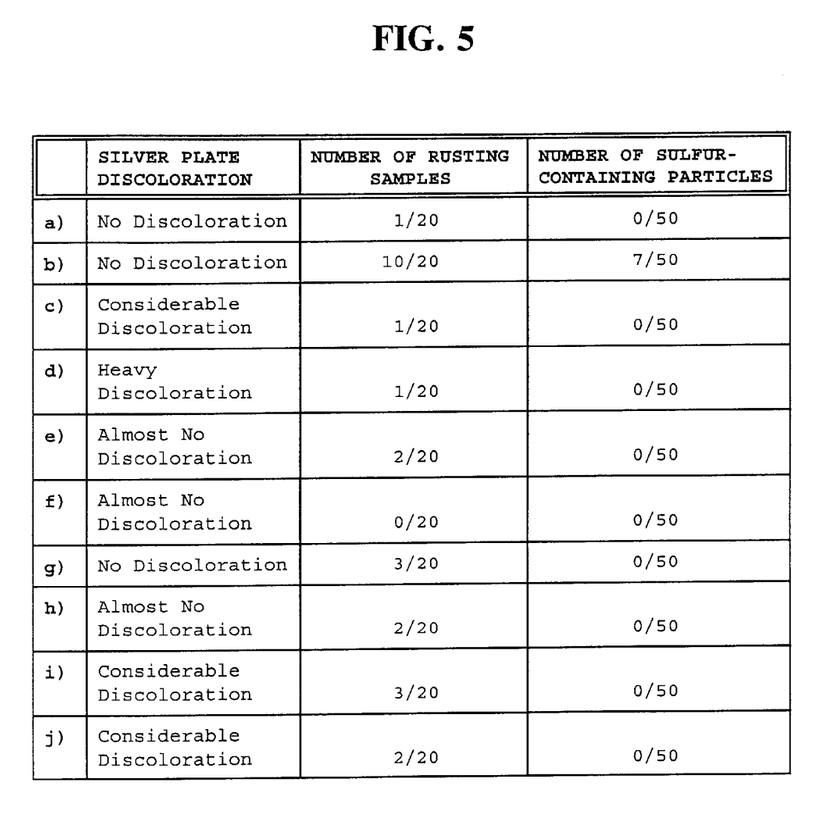
FIG. 5 is a table showing results of evaluation of the Examples and Comparative Examples for a further aspect of the invention.

As demonstrated by the results summarized in FIG. 5, the sample rotor hubs of Examples 5–9 in accordance with the invention showed no substantial generation of sulfur-containing gas, which generation would adversely affect the hard disk apparatus. Examples 5–9 further show a reduced rusting tendency and substantially no deposition of sulfur-containing particles, in contrast to the Comparative Examples.

3. Degreasing, Rust-Removing and Descaling of Free Cutting Stainless Steel

In accordance with a third aspect of the present invention, the free cutting stainless steel which has been prepared to meet the above-described requirements, is machined into a desired shape and is then subjected to a degreasing treatment. The degreasing treatment is conducted with a chlorine-type or hydrocarbon-type solvent, such as methylene chloride, trichloroethylene, tetrachloroethylene or the like or, alternatively, an alkali aqueous solution, such as sodium hydroxide or the like. The surface of the stainless steel part is cleaned as a result of the degreasing treatment.

More specifically, the degreasing treatment effectively serves to remove chlorine and sulfur transferred from the machining oil during the machining, and dust and cuttings generated during the machining, as well as micro-fine grains of free cutting components, such as sulfides. This degreasing treatment alone, however, cannot completely remove scale, rust and particles residing in fine recesses of complicated machined surface, failing to ensure sufficiently high corrosion resistance.

Therefore, in accordance with this aspect of the invention, after the degreasing treatment, the stainless steel part is subjected to a chemical treatment for rust removal and descaling. This rust-removing, descaling chemical treatment may be effected by electrolytic cleaning, using an aqueous solution of an acid, such as nitric acid, sulfuric acid, hydrochloric acid or the like, or an aqueous solution of an alkali such as sodium hydroxide, potassium hydroxide, sodium silicate, sodium phosphate, sodium gluconate or the like. The contaminant, scale and particles can be removed almost completely by this chemical rust-removing, descaling treatment, whereby high corrosion resistance peculiar to the stainless steel can be fully utilized and contamination by particles avoided.

The rust-removing, descaling treatment may be conducted under relatively gentle conditions, whichever one of the aforementioned techniques is employed. Use of a stainless steel having a manganese-to-sulfur ratio Mn/S of 1.8 or less enhances generation of chemically stable CrS, thus contributing to generation of $H_2S$ through the rust-removing, descaling chemical treatment. However, generation of sulfur-containing gas is observed even with this type of stainless steel when the treatment is conducted by employing a commonly used acid solution having an acid concentration of 15 percent by volume or higher. This is because such an acid solution dissolves the chemically stable CrS. It is, therefore, preferred that the rust-removing, descaling chemical treatment be conducted with an aqueous solution of an acid having an acid concentration of 3 percent by volume or less. The stainless steel which has undergone the rust-removing, descaling chemical treatment described above, exhibits improved corrosion resistance and reduced particle contamination.

A further improvement in the corrosion resistance is achievable by effecting an optional chromate treatment on the stainless steel which has undergone the rust-removing, descaling chemical treatment. Such a chromate treatment forcibly forms an oxide film on the surface of the stainless steel part, thereby remarkably enhancing resistance to corrosion.

Advantages of the above-described aspects of the present invention can be further appreciated in light of the following examples.

EXAMPLE 10

An 18 Cr stainless steel, having a sulfur content of 0.3 percent by mass and a manganese content of 0.4 percent by mass (Mn/S ratio=1.33), was prepared. This stainless steel was machined to form samples of a rotor hub 40 shown in FIG. 3, i.e., the rotor hub which forms part of a spindle motor and which is to be accommodated in the clean chamber of a hard disk apparatus.

Each sample of the rotor hub 40 thus formed was subjected to a degreasing process, conducted using methylene chloride and sodium hydroxide. Each of the samples was then subjected to a rust-removing, descaling chemical treatment conducted by immersing the rotor hubs in a 2 percent by volume aqueous solution of hydrochloric acid of room temperature for 3 minutes. The rotor hub samples were then rinsed with water, pure hot water and pure water, followed by a hot-air dehydration. Each sample thus treated was placed in a sealable 100 ml container, together with a silver plate (stainless steel sheet plated with silver).

Each container was then hermetically sealed after dripping two or three droplets of pure water into the container, and was shelved for 12 hours in a 90° C. atmosphere. The silver plate was then taken out of the container for visual observation of the degree of discoloration (silver plate color test).

Twenty (20) pieces of such rotor hub samples, having undergone the rust-removing descaling treatment, were shelved for 360 hours in an 80° C. atmosphere of 90% humidity. Each piece of rotor hub was then subjected to optical microscopic observation for any rusting.

A conductive tape was brought into contact with the surface of each of three pieces of the sample rotor hubs which had undergone the rust-removing, descaling chemical treatment. Fifty (50) arbitrarily selected particles of foreign matter transferred to the tape were analyzed through a scanning electron microscope/energy distribution X-ray analyzer (SEM/EDX), for the purpose of investigating the number of sulfur-containing particles. The results of this evaluation are summarized in line a) of the table shown in FIG. 6.

EXAMPLE 11

Sample rotor hubs prepared in Example 10 were subjected to an alkali degreasing treatment and then to an electrolytic cleaning, in which each sample rotor hub was connected to anode and held for 2 minutes in an alkali aqueous solution containing 3 percent by volume of orthosodium silicate, 2 percent by volume of sodium hydroxide and 2 percent by volume of sodium carbonate. The sample rotor hubs were then rinsed with water, hot pure water and pure water, followed by dehydration with hot air. The sample rotor hubs thus treated were evaluated to obtain the results shown in line b) of the table of FIG. 6.

EXAMPLE 12

The sample rotor hubs which underwent the electrolytic cleaning in Example 11 were then subjected to a chromate treatment, in which the sample rotor hubs were immersed in a 5 percent by weight aqueous solution of sodium bichromate at 70° C. for 30 minutes. Evaluation was conducted in the same manner as in the preceding Examples, to obtain the results shown in line c) of the table of FIG. 6.

EXAMPLE 13

The sample rotor hubs prepared in Example 10 were immersed for 20 minutes in a 50 percent by volume solution of nitric acid of the normal temperature for rust removal and descaling, followed by rinsing with water, pure hot water and pure water and a subsequent dehydration. Evaluation was conducted in the same manner as in the preceding Examples, to obtain the results shown in line d) of the table of FIG. 6.

COMPARATIVE EXAMPLE 7

Sample rotor hubs were prepared by machining an 18 Cr stainless steel having a sulfur content of 0.3 percent by mass and a manganese content of 1.2 percent by mass (Mn/S=4), and by subjecting them to the same treatment described above with reference to Example 10. Evaluation was conducted in the same manner as in the preceding Examples, to obtain the results shown in line e) of the table of FIG. 6.

COMPARATIVE EXAMPLE 8

Sample rotor hubs were prepared by machining an 18 Cr stainless steel having a sulfur content of 0.3 percent by mass and a manganese content of 1.2 percent by mass (Mn/S=4), and by subjecting them to the same treatment described above with reference to Example 11. Evaluation was conducted in the same manner as in the preceding Examples, to obtain the results shown in line f) of the table of FIG. 6.

COMPARATIVE EXAMPLE 9

Figure 3:
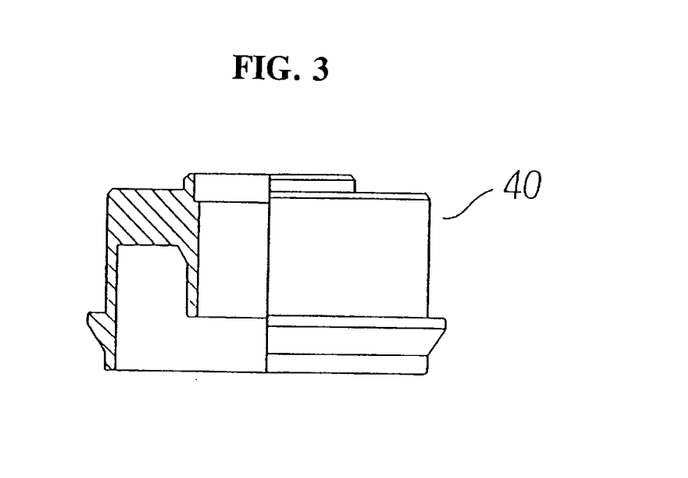
FIG. 3 is a partly-sectioned elevational view of a rotor hub of a spindle motor, used as a sample in the Examples.

Sample rotor hub 40 having a configuration as shown in FIG. 3 was prepared by machining an 18 Cr stainless steel having a sulfur content of 0.3 percent by mass and a manganese content of 1.2 percent by mass (Mn/S=4), and then rinsing with methylene chloride. Evaluation was conducted in the same manner as in the preceding Examples, to obtain the results shown in line g) of the table of FIG. 6.

Figure 6:
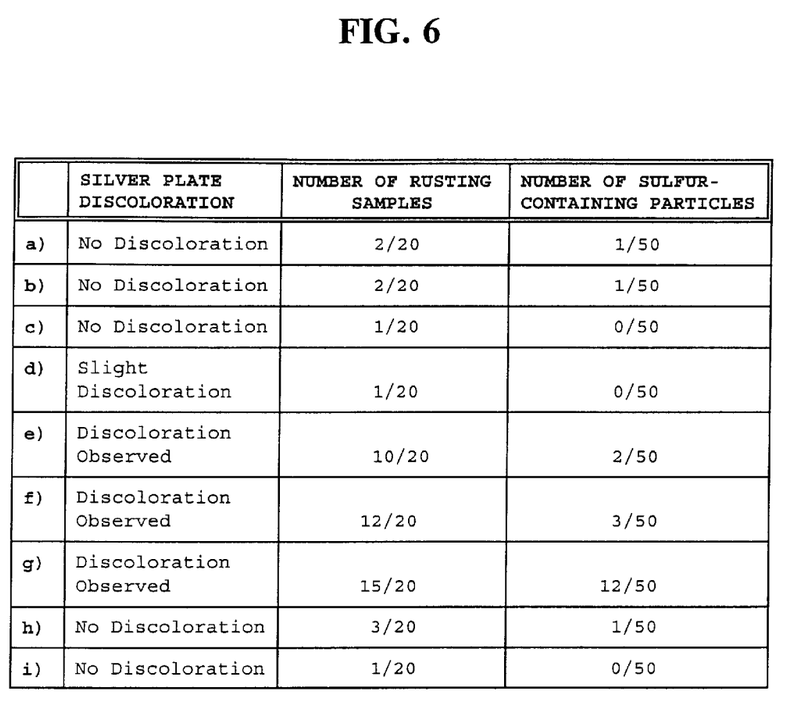
FIG. 6 is a table showing results of evaluation of the Examples and Comparative Examples for further aspects of the invention.

As clearly demonstrated by the results shown in FIG. 6, the sample rotor hubs of Examples 10–13 showed no or only a slight change in color of the silver plates caused by sulfur-containing gas, as compared with the sample rotor hubs of Comparative Examples 7–9, thus demonstrating improved corrosion resistance. In addition, Examples 10–13 showed no substantial generation of sulfur-containing gas which generation would adversely affect the hard disk apparatus, thus offering a remarkable advantage.

4. Degreasing and Chromate Treatment of Free Cutting Stainless Steel

In accordance with a further aspect of the present invention, the free cutting stainless steel which has been prepared to meet the above-described requirements, is subjected to a degreasing and subsequent chromate treatment. As described above, the chromate treatment forcibly forms an oxide film on the surface of the stainless steel, thereby especially improving resistance to corrosion without influence of the generation of the sulfur-containing corrosive gas and of the dissolution of the free cutting components on the surface of the steel material. To further improve the resistance to corrosion, the free cutting stainless steel can optionally be subjected to mechanical descaling before the degreasing.

The advantages of this aspect of the present invention will be apparent from the following examples.

EXAMPLE 18

Sample rotor hubs prepared in Example 10 were subjected to an alkali degreasing treatment and were then subjected to a chromate treatment in which the sample rotor hubs were immersed in a 5 percent by weight aqueous solution of sodium bichromate at 70° C. for 30 minutes. Evaluation was conducted in the same manner as in the preceding Examples, to obtain the results shown in line h) of the table of FIG. 6.

EXAMPLE 19

Sample rotor hubs prepared in Example 10 were subjected to rinsing with ethylene oxide, and were then the whole of the disk mounting surface was buffed. The sample rotor hubs were subsequently subjected to a degreasing treatment, and were evaluated in the same manner as in the preceding Examples, to obtain the results shown in line i) of the table of FIG. 6.

The results shown in FIG. 6 demonstrate that the sample rotor hubs of Examples 18 and 19 showed no change in color of the silver plates caused by sulfur-containing gas, as compared with the sample rotor hubs of Comparative Examples 6–8, thus demonstrating improved corrosion resistance. In addition, Examples 18 and 19 showed no substantial generation of sulfur-containing gas which generation would adversely affect the hard disk apparatus, thus offering a remarkable advantage.

Although the invention has been described in terms of practical embodiments, it is to be understood that the described embodiments are only illustrative, and various modifications and changes may be imparted without departing from the spirit and scope of the present invention.

What is claimed is:

1. A hard disk apparatus, comprising:

a clean chamber accommodating a hard disk driven by a spindle motor, and a magnetic head capable of making access to said hard disk, wherein a free cutting stainless steel is used as the material of a member accommodated in said clean chamber, said free cutting stainless steel having a sulfur (S) content of not less than 0.25 percent by mass and a manganese-to-sulfur content ratio (Mn/S) of not greater than 1.8, said free cutting stainless steel having been subjected to a passivation treatment and, after the passivation treatment, said free cutting stainless steel is heat treated at a temperature of from about 100° C. to about 200° C.

wherein a sulfur compound contained within the free cutting stainless steel is stabilized, thereby improving resistance to corrosion, and sulfur-containing corrosive gas generated from reaction of the sulfur compound with moisture in air is reduced.

2. The hard disk apparatus according to claim 1, wherein the passivation treatment is conducted with a nitric acid treating solution.

3. The hard disk apparatus according to claim 1, wherein the passivation treatment is conducted with a treating solution which is a mixture of nitric acid and sodium bichromate, and wherein an alkali neutralizing treatment is conducted after the passivation treatment.

4. The hard disk apparatus according to claim 3, wherein a chromate treatment is conducted after the alkali neutralizing treatment.

5. The hard disk apparatus according to claim 1, wherein said member is a rotor hub of said spindle motor.

6. A data storage device, comprising a clean chamber accommodating a component, said component being formed from a free cutting stainless steel, said free cutting stainless steel having a sulfur (S) content of not less than 0.25 percent by mass and a maganese-to-sulfur content ratio (Mn/S) of not greater than 1.8, said free cutting stainless steel having been subjected to a passivation treatment and, after the passivation treatment, said free cutting stainless steel is heat treated at a temperature of from about 100° C. to about 200° C.

wherein a sulfur compound contained within the free cutting stainless steel is stabilized, thereby improving resistance to corrosion, and sulfur-containing corrosive gas generated from reaction of the sulfur compound with moisture in air is reduced.

7. The data storage device according to claim 6, wherein the passivation treatment is conducted with a nitric acid treating solution.

8. The data storage device according to claim 6, wherein the passivation treatment is conducted with a treating solution which is a mixture of nitric acid and sodium bichromate, and wherein an alkali neutralizing treatment is conducted after the passivation treatment.

9. The data storage device according to claim 7, wherein a chromate treatment is conducted after the alkali neutralizing treatment.

10. The data storage device according to claim 6, wherein a spindle motor is accommodated in the clean chamber for driving one or more data storage media, and a rotor hub of said spindle motor constitutes a part of said component.

11. A hard disk apparatus, comprising:

a clean chamber accommodating a hard disk driven by a spindle motor, and a magnetic head capable of making access to said hard disk, wherein a free cutting stainless steel is used as the material of a member accommodated in said clean chamber, said free cutting stainless steel having a sulfur (S) content of not less than 0.25 percent by mass and a manganese-to-sulfur content ratio (Mn/S) of not greater than 1.8, said free cutting stainless steel having been subjected to a passivation treatment and, after the passivation treatment, said free cutting stainless steel is heat treated at a temperature of from about 70° C. to about 150° C. in a vacuum or a substantially vacuum atmosphere, wherein a sulfur compound contained within the free cutting stainless steel is stabilized, thereby improving resistance to corrosion, and sulfur-containing corrosive gas generated from reaction of the sulfur compound with moisture in air is reduced.

12. The hard disk apparatus according to claim 11, wherein the passivation treatment is conducted with a nitric acid treating solution.

13. The hard disk apparatus according to claim 11, wherein the passivation treatment is conducted with a treating solution which is a mixture of nitric acid and sodium bichromate, and wherein an alkali neutralizing treatment is conducted after the passivation treatment.

14. The hard disk apparatus according to claim 13, wherein a chromate treatment is conducted after the alkali neutralizing treatment.

15. The hard disk apparatus according to claim 11, wherein said member is a rotor hub of said spindle motor.

16. A data storage device, comprising a clean chamber accommodating a component, said component being formed from a free cutting stainless steel, said free cutting stainless steel having a sulfur (S) content of not less than 0.25 percent by mass and a manganese-to-sulfur content ratio (Mn/S) of not greater than 1.8, said free cutting stainless steel having been subjected to a passivation treatment and, after the passivation treatment, said free cutting stainless steel is heat treated at a temperature of from about 70° C. to about 150° C. in a vacuum or a substantially vacuum atmosphere, wherein a sulfur compound contained within the free cutting stainless steel is stabilized, thereby improving resistance to corrosion, and sulfur-containing corrosive gas generated from reaction of the sulfur compound with moisture in air is reduced.

17. The hard disk apparatus according to claim 16, wherein the passivation treatment is conducted with a nitric acid treating solution.

18. The hard disk apparatus according to claim 16, wherein the passivation treatment is conducted with a treating solution which is a mixture of nitric acid and sodium bichromate, and wherein an alkali neutralizing treatment is conducted after the passivation treatment.

19. The hard disk apparatus according to claim 18, wherein a chromate treatment is conducted after the alkali neutralizing treatment.

20. The hard disk apparatus according to claim 16, wherein said member is a rotor hub of said spindle motor.

* * * * *